(12) United States Patent
Vining et al.

(10) Patent No.: US 6,377,526 B1
(45) Date of Patent: Apr. 23, 2002

(54) ERASABLE WORM OPTICAL DISK AND METHOD OF WRITING THERETO MULTIPLE TIMES

(75) Inventors: Richard C. Vining, Elk River; Kent Macleod, Hopkins, both of MN (US)

(73) Assignee: Plasmon IDE, Inc., Eden Prairie, MN (US)

( * ) Notice: Subject to any disclaimer, the term of this patent is extended or adjusted under 35 U.S.C. 154(b) by 0 days.

(21) Appl. No.: 09/283,050

(22) Filed: Apr. 1, 1999

(51) Int. Cl.[7] ................................................. G11B 7/00

(52) U.S. Cl. .................. 369/53.1; 369/275.3; 369/53.2; 369/53.24

(58) Field of Search ............................... 369/53.1, 47.5, 369/47.2, 47.22, 47.27, 275.1, 275.2, 53.24

(56) References Cited

U.S. PATENT DOCUMENTS

| | | |
|---|---|---|
| 3,831,197 A | 8/1974 | Beach et al. |
| 3,865,228 A | 2/1975 | Hufford |

(List continued on next page.)

FOREIGN PATENT DOCUMENTS

| | | |
|---|---|---|
| DE | 3710650 A1 | 10/1988 |
| EP | 280263 A2 | 8/1988 |
| EP | 0 452 884 A3 | 10/1991 |
| EP | 0 652 561 A2 | 5/1995 |
| JP | 59-30263 | 2/1984 |
| JP | 59-36003 | 2/1984 |
| JP | 59-231763 | 12/1984 |
| JP | 61-240474 | 10/1986 |
| JP | 1-50275 | 2/1989 |
| JP | 2-292150 | 12/1990 |
| JP | 405282764 A | 10/1993 |
| SU | 1014788 | 4/1983 |

OTHER PUBLICATIONS

"Dual Media Optical Disk", IBM Technical Disclosure Bulletin, vol. 37, No. 11, Nov. 1994, pp. 455–456.

Primary Examiner—Nabil Hindi
(74) Attorney, Agent, or Firm—Rider, Bennett, Egan & Arundel

(57) ABSTRACT

A method for selectively enabling writing of data multiple times onto a write-once read-many optical disk by a host system, the disk having a disk type indicator, and each sector having a SWF field and a flag field and user data, wherein new data bits replace existing data bits in a one-for-one ratio without mapping, comprising the steps of: reading a disk type indicator; setting a firmware flag allowing writing to the disk if the disk type is erasable WORM; receiving a write command from the host system, the command specifying a sector to write to; reading the contents of the disk SWF and flag fields for the sector; overwriting all user data on the sector with all zeroes if the firmware flag is set; replacing every user data bit in the sector with a zero in a one-for-one ratio without mapping; and resetting the contents of the disk SWF and flag fields to indicate the sector is available for writing. Apparatus for selectively enabling writing of data multiple times onto a write-once read-many optical disk by a host system, the disk having a disk type indicator, and each sector having a SWF field and a flag field and user data, wherein new data bits replace existing data bits in a one-for-one ratio without mapping, comprising an optical disk drive having: a spindle motor rotating an optical disk; an optical assembly/laser generating a laser beam adapted to heat a minute region on the optical disk; a bias magnet affecting the polarity of the heated region; a write/read channel driving the optical assembly/laser and bias magnet; a write/read controller adapted to process a unique erase command and thereby controlling the optical assembly/laser and bias magnet to write every user data bit of a sector to zero in a one-for-one ratio without mapping; and a small computer system interface receiving write commands from a host system.

10 Claims, 8 Drawing Sheets

U.S. PATENT DOCUMENTS

| | | | |
|---|---|---|---|
| 4,271,440 A | | 6/1981 | Jenkins et al. |
| 4,504,936 A | | 3/1985 | Faber et al. |
| 4,607,354 A | | 8/1986 | Ishibashi et al. |
| 4,608,679 A | | 8/1986 | Rudy et al. |
| 4,614,474 A | | 9/1986 | Sudo |
| 4,654,727 A | | 3/1987 | Blum et al. |
| 4,675,856 A | | 6/1987 | Rudy et al. |
| 4,690,602 A | | 9/1987 | Castaldi et al. |
| 4,690,611 A | | 9/1987 | Nobuhara |
| 4,691,299 A | * | 9/1987 | Rivest et al. ............... 369/59 |
| 4,827,463 A | | 5/1989 | Motoyoshi et al. |
| 4,839,758 A | | 6/1989 | Honjoh |
| 4,710,797 A | | 12/1987 | Tanaka |
| 4,742,504 A | | 5/1988 | Takasuka et al. |
| 4,754,397 A | | 6/1988 | Varaiya et al. |
| 4,787,074 A | | 11/1988 | Deck et al. |
| 4,787,310 A | | 11/1988 | Tiemann |
| 4,815,055 A | | 3/1989 | Fago, Jr. |
| 4,815,056 A | | 3/1989 | Toi et al. |
| 4,817,070 A | | 3/1989 | Hug et al. |
| 4,817,071 A | | 3/1989 | Carlson et al. |
| 4,846,619 A | | 7/1989 | Crabtree et al. |
| 4,852,075 A | | 7/1989 | Feyrer et al. |
| 4,853,916 A | | 8/1989 | Tomita |
| 4,878,137 A | | 10/1989 | Yamashita et al. |
| 4,910,675 A | | 3/1990 | Burns et al. |
| 4,912,580 A | | 3/1990 | Hanson |
| 4,912,581 A | | 3/1990 | Watanabe |
| 4,939,713 A | | 7/1990 | Satoh et al. |
| 4,947,367 A | * | 8/1990 | Chang et al. ............... 364/900 |
| 4,953,122 A | | 8/1990 | Williams |
| 4,998,232 A | | 3/1991 | Methlie et al. |
| 5,001,582 A | | 3/1991 | Numasaki |
| 5,010,536 A | | 4/1991 | Wanger et al. |
| 5,014,255 A | | 5/1991 | Wanger et al. |
| 5,029,125 A | * | 7/1991 | Sciupac ............... 364/900 |
| 5,033,038 A | | 7/1991 | Kobayashi et al. |
| 5,036,503 A | | 7/1991 | Tomita |
| 5,040,110 A | | 8/1991 | Miki et al. |
| 5,040,159 A | | 8/1991 | Oliver et al. |
| 5,043,962 A | | 8/1991 | Wanger et al. |
| 5,056,073 A | | 10/1991 | Fitzgerald et al. |
| 5,060,211 A | | 10/1991 | Blanding |
| 5,062,093 A | | 10/1991 | Christie et al. |
| 5,065,379 A | | 11/1991 | Smith et al. |
| 5,101,387 A | | 3/1992 | Wanger et al. |
| 5,107,481 A | | 4/1992 | Miki |
| 5,120,136 A | * | 6/1992 | Oakley ............... 369/44.12 |
| 5,123,000 A | | 6/1992 | Fitzgerald et al. |
| 5,150,341 A | | 9/1992 | Shibayama |
| 5,153,862 A | | 10/1992 | Taylor et al. |
| 5,206,845 A | | 4/1993 | Baxter et al. |
| 5,213,463 A | | 5/1993 | Rothlisberger et al. |
| 5,220,548 A | | 6/1993 | Nakatsukasa et al. |
| 5,228,016 A | | 7/1993 | Menke |
| 5,231,552 A | | 7/1993 | Schneider et al. |
| 5,233,576 A | | 8/1993 | Curtis et al. |
| 5,255,251 A | | 10/1993 | Fitzgerald et al. |
| 5,265,078 A | | 11/1993 | Akiyama et al. |
| 5,276,675 A | | 1/1994 | Wanger et al. |
| 5,280,467 A | | 1/1994 | Wanger et al. |
| 5,345,350 A | | 9/1994 | Ellis et al. |
| 5,360,651 A | | 11/1994 | Baxter et al. |
| 5,362,192 A | | 11/1994 | Dang |
| 5,377,121 A | | 12/1994 | Dimitri et al. |
| 5,431,520 A | | 7/1995 | Brugger |
| 5,446,857 A | | 8/1995 | Russ |
| 5,471,561 A | | 11/1995 | Cowgill et al. |
| 5,475,820 A | | 12/1995 | Natrasevschi |
| 5,502,697 A | | 3/1996 | Taki |
| 5,546,366 A | | 8/1996 | Dang |
| 5,602,821 A | | 2/1997 | McPherson et al. |
| 5,764,615 A | | 6/1998 | Ware et al. |
| 5,798,997 A | | 8/1998 | Ware et al. |
| 5,802,028 A | | 9/1998 | Igarashi |
| 5,813,009 A | | 9/1998 | Johnson et al. |

\* cited by examiner

Fig. 2
PRIOR ART

PRE-FORMATTED HEADER

| SM | VFO1 | AM | ID1 | VFO2 | AM | ID2 | PA1 |
|---|---|---|---|---|---|---|---|
| 8 | 26 | 1 | 5 | 16 | 1 | 5 | 2 |

ALPC AND GAPS

| GAP | FLAG | GAP | ALPC |
|---|---|---|---|
| 4 | 5 | 2 | 6 |

| PRE-FORMATTED HEADER | TA1 | ALPC, GAPS | VFO3 | SYNC | DATA FIELD | PA2 | BUFFER | TA2 |
|---|---|---|---|---|---|---|---|---|
| 64 | 1 | 17 | 27 | 4 | 2498 USER DATA, SWF, CRC, RESYNC | 2 | 21 | 1 |

Fig. 3
PRIOR ART

| ZONE NAME | CONTENT | | | | | |
|---|---|---|---|---|---|---|
| LEAD-IN ZONE | | | | | | |
| SFP ZONE | SFP1 | SFP2 | SFP3 | SFP4 | ... | SFP |
| OUTER MANUFACTURER ZONE | DMA'S | | | | | |
| USER ZONE | USER AREA | | | | | |
| | DMA'S | | | | | |
| INNER MANUFACTURER ZONE | | | | | | |
| SFP ZONE | SFP1 | SFP2 | SFP3 | SFP4 | ... | SFP |
| TRANSITION ZONE | | | | | | |
| PEP ZONE | PEP | PEP | PEP | | | |
| REFLECTIVE ZONE | | | | | | |

Fig. 4
PRIOR ART

| BYTE \ BIT | 7 | 6 | 5 | 4 | 3 | 2 | 1 | 0 |
|---|---|---|---|---|---|---|---|---|
| 0 | FORMAT | | | | | | | |
| 1 | 0 | ECC | LOGICAL ZCAV | | 0 | MODULATION CODE | | |
| 2 | NUMBER OF SECTORS IN EACH LOGICAL TRACK | | | | | | NUMBER OF USER BYTES | |
| 3 | BASELINE REFLECTANCE AT 685 nm | | | | | | | |
| 4 | 0 | | | | AMPLITUDE AND POLARITY OF PRE-FORMATTED DATA | | | |
| 5 | ODC CAPACITY | | | | | | | |
| 6 | MAXIMUM READ POWER FOR THE SFP ZONE AT 50 HZ AND 685 nm | | | | | | | |
| 7 | DISK TYPE | | | | | | | |
| 8 | START TRACK OF OUTER SFP ZONE, NEXT MSB OF LOGICAL TRACK NUMBER | | | | | | | |
| 9 | START TRACK OF OUTER SFP ZONE, LSB OF LOGICAL TRACK NUMBER | | | | | | | |
| 10 | START TRACK OF INNER SFP ZONE, NEXT MSB OF LOGICAL TRACK NUMBER | | | | | | | |
| 11 | START TRACK OF INNER SFP ZONE, LSB OF LOGICAL TRACK NUMBER | | | | | | | |
| 12 | TRACK PITCH | | | | | | | |
| 13 | (FF) | | | | | | | |
| 14 | START TRACK OF OUTER SFP ZONE, MSB OF LOGICAL TRACK NUMBER | | | | | | | |
| 15 | START TRACK OF INNER SFP ZONE, MSB OF LOGICAL TRACK NUMBER | | | | | | | |
| 16 | NOT SPECIFIED BY ISO/IEC 15286 STANDARD | | | | | | | |
| 17 | NOT SPECIFIED BY ISO/IEC 15286 STANDARD | | | | | | | |

ERASABLE WORM OPTICAL DISK AND METHOD OF WRITING THERETO MULTIPLE TIMES

BACKGROUND OF THE INVENTION

The present invention relates to optical storage media, and in particular to an optical write once-read many (WORM) optical medium which may also be fully physically erased and re-written.

Optical media for storing data are well-known in the art. The great advantage of such optical storage media is the very high storage capacity (on the order of $10^{11}$ bits of data, or the equivalent of forty reels of magnetic tape).

These characteristics of optical media make them ideal for storing large amounts of data which must be retained for a long time, but is seldom accessed. For example, optical media are frequently used for the storage of tax records, which must be kept for several years.

Non-erasable, or write-once, optical data storage media have a plurality of bit positions, each of which can be irreversibly changed from an original state to a new state, but only one time. Thus typically the initial state of the bit position is designated as a "one" or a "zero" and the "zero" can be overwritten with a "one" when data is written onto the medium. Once the data has been written in a section of the medium, which may be all of the medium, that section is considered to be "used" and cannot be re-used for recording new data.

This characteristic of WORM media leads to their principal disadvantage: waste. Even though the medium has very high data storage capacity, the data storage cannot be re-used.

Many attempts have been made in the art to enable the high storage capacity of WORM disk memories to be utilized efficiently in a computer system in a manner analogous to magnetic disk storage systems, wherein data in a given sector can be updated at will. All such attempts, however, have involved some "mapping" of either the physical addresses on the medium that are written to, or of the data already present on the medium. No known method in the art exists of transparently writing new data bits to an already-written WORM medium without mapping.

These earlier attempts have inherent problems. One key problem is how the directory or index of stored data is maintained. Without such directory information, it is impossible to selectively access and retrieve data on the disk. In one approach, when data is stored on the optical disk its location is maintained in some sort of directory or index stored on a companion magnetic floppy or hard disk. This method is obviously inefficient and susceptible to loss of the directory on the magnetic medium, making all data on the optical medium inaccessible.

Another approach has been to combine the above approach with rewriting the entire magnetic memory version of the directory onto the optical disk immediately prior to the removal of the disk or powering down of the system. The disadvantage of this approach is that it uses much disk space since the entire directory may be written onto the disk many times, and it is vulnerable to loss of the directory by power interruption before the directory has been rewritten onto the optical disk.

A third approach relies on address pointer fields associated with each data segment written onto the disk. When data is written onto a particular segment of the optical disk, the associated pointer field remains blank. When an update of the data is desired, it is written to a different segment and the physical address, i.e., the actual physical location on the disk where the updated data has been written, is written to the pointer field of the original data segment. This approach has the inherent disadvantage of long chains of pointers when data is written to the disk many times, and of wasted physical disk space caused by the pointer chains.

Another approach, exemplified by U.S. Pat. No. 4,691,299, is to "map" data bits onto the physical optical disk by using a greater number of physical media bits to represent the data bits. This approach gives the appearance of being able to "rewrite" the optical disk, but in fact the actual data bits on the optical disk are not re-written. Instead, new data bits are used. Like all mapping approaches, this method has the inherent disadvantage of not fully utilizing the physical disk capacity. For example, a mapping scheme that employs four physical media data bits to write three incoming data bits can increase the apparent physical storage capacity of the optical disk by only one-third. More complex mapping schemes may result in higher disk utilization, but never 100% utilization, and at the inherent cost of processing power and delay. This method also allows the physical disk to be re-written only once.

There is thus a need for an apparatus and method for physically erasing and re-writing all physical data bits of a "non-erasable" optical storage medium any number of times, without any mapping of the incoming data to existing data on the disk.

In particular, the 130 mm optical disk products available in the market fit into three categories: magneto-optic, which are writable, erasable, and re-writable; CCW WORM, which is a write-once version of magneto-optic; and ablative (or permanent) WORM, which physically alters the recording layer of the disk when writing data to the disk. These categories are further defined in International Draft Standard ISO/TEC FCD 15286:1997 (E), which specifies the following Type designations:

Type R/W: provides for data to be written, read and erased many times over the recording surface of the corresponding disk side, using the thermo-magnetic and magneto-optical effects.

Type P_ROM: provides for a part of the disk surface to be pre-recorded and reproduced by stamping or other means. This part of the disk is read without recourse to the magneto-optical effect. All parts which are not pre-recorded provide for data to meet the requirements of Type R/W.

Type O-ROM: provides for the whole of the disk surface to be pre-recorded and reproduced by stamping or other means. The corresponding disk sides are read without recourse to the magneto-optical effect.

Type DOW: provides for data to be written and read many times over the recording surface of the corresponding disk side, using the direct overwrite thermo-magnetic and magneto-optical effects requiring a single external magnetic field.

Type P-DOW: provides for a part of the disk surface to be pre-recorded and reproduced by stamping or other means. This part of the disk is read without recourse to the magneto-optical effect. All parts which are not pre-recorded provide for data to meet the requirements of Type DOW.

Type WO: provides write once, read multiple functionality using the thermomagnetic and magneto-optical effects.

Type WO_DOW: provides write once, read multiple functionality using the direct overwrite thermo-magnetic and magneto-optical effects.

The need for a new category is beginning to take shape in the marketplace: one with the technical characteristics of WORM (i.e., Types WO and WO_DOW), but with the ability to selectively delete files completely from the disk in a manner such that the data cannot later be recovered by any means. The primary application for this new product type is where data files, such as tax records, are required to be kept for a prescribed period of time, typically 7 years, but after that time period has expired it is in the best interest of the user to delete this data.

Traditional "erasable" optical disk products do not fully meet this need, because of the chance that data may inadvertently be over-written. Traditional WORM products do not meet this need because the data cannot physically overwritten.

The present invention satisfies this need by providing a method and apparatus such that data on an optical disk cannot be inadvertently overwritten, while at the same time providing the capability to erase completely a given data file or the entire disk surface. Additionally, new data may be written to the erased portions, taking advantage of the entire disk capacity.

SUMMARY OF THE INVENTION

A method for selectively enabling writing of data multiple times onto a write-once read-many optical disk by a host system, the disk having a disk type indicator, and each sector having a SWF field and a flag field and user data, wherein new data bits replace existing data bits in a one-for-one ratio without mapping, comprising the steps of: reading a disk type indicator; setting a firmware flag allowing writing to the disk if the disk type is erasable WORM; receiving a write command from the host system, the command specifying a sector to write to; reading the contents of the disk SWF and flag fields for the sector; overwriting all user data on the sector with all zeroes if the firmware flag is set; replacing every user data bit in the sector with a zero in a one-for-one ratio without mapping; and resetting the contents of the disk SWF and flag fields to indicate the sector is available for writing. Apparatus for selectively enabling writing of data multiple times onto a write-once read-many optical disk by a host system, the disk having a disk type indicator, and each sector having a SWF field and a flag field and user data, wherein new data bits replace existing data bits in a one-for-one ratio without mapping, comprising an optical disk drive having: a spindle motor rotating an optical disk; an optical assembly/laser generating a laser beam adapted to heat a minute region on the optical disk; a bias magnet affecting the polarity of the heated region; a write/read channel driving the optical assembly/laser and bias magnet; a write/read controller adapted to process a unique erase command and thereby controlling the optical assembly/laser and bias magnet to write every user data bit of a sector to zero in a one-for-one ratio without mapping; and a small computer system interface receiving write commands from a host system.

A principal object and advantage of the present invention is that it prevents standard disk input/output commands from overwriting data on a WORM disk, while allowing data on the WORM disk to be erased when special disk input/output commands are issued to the optical disk drive.

Another principal object and advantage of the present invention is that it completely erases data in a given sector or sector(s) on a WORM optical disk drive.

Another principal object and advantage of the present invention is that it completely erases all data in the user data area on a WORM optical disk drive.

Another principal object and advantage of the present invention is that it allows the host system to write new data to the user data area of a WORM optical disk drive with the new data bits replacing the old data bits on a one-to-one ratio with no mapping, thus using all of the available user data space on the optical disk drive.

Another object and advantage of the present invention is that it does not need chains of pointers in the user data area of the WORM drive to keep track of old data. Old data is completely replaced with new data.

Another object and advantage of the present invention is that data cannot be recovered from the WORM drive by any means once it is erased.

Another object and advantage of the present invention is that it conforms to existing international standards with only slight modifications.

BRIEF DESCRIPTION OF THE DRAWINGS

FIG. 2 is a schematic illustrating the 2048 byte sector format for 130 mm optical disk cartridges according to draft International Standard ISO/TEC FCD 15286:1997(E).

FIG. 3 is a schematic illustrating a Table of Defined Zones according to draft International Standard ISO/TEC FCD 15286:1997(E).

FIG. 4 is a schematic illustrating the PEP Zone Sector Data Field format according to draft International Standard ISO/TEC FCD 15286:1997(E).

DETAILED DESCRIPTION OF THE PREFERRED EMBODIMENTS

Figure 1:
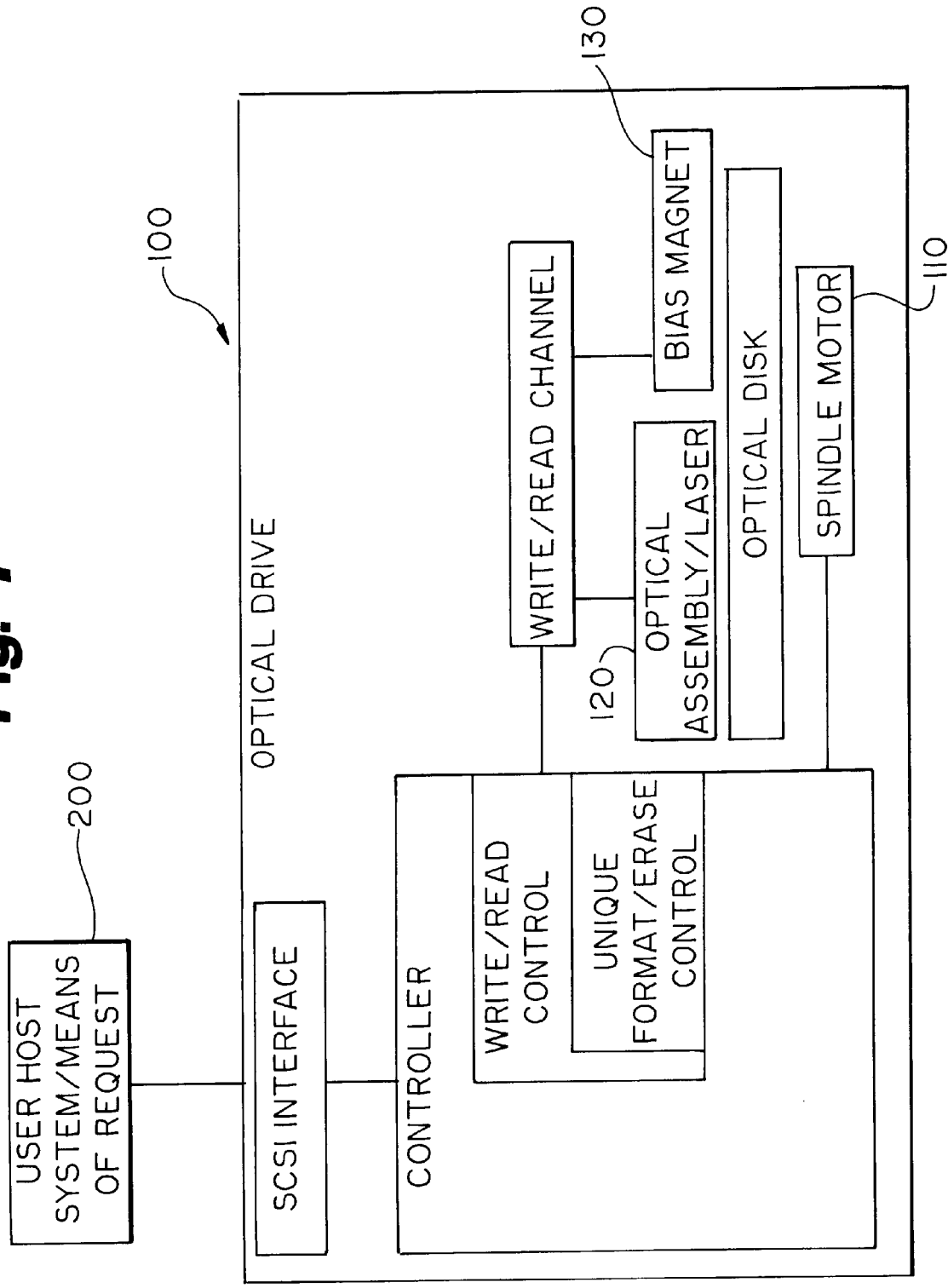
FIG. 1 is a schematic block diagram of an apparatus according to the present invention.

The process of writing data onto CCW WORM disks, that is, disk types WO and WO-DOW, is achieved by a thermomagnetic effect typically created in the following manner.

As the disk is rotated by spindle motor 110 within drive 100 at a given speed, a laser assembly 120 within the drive 100 heats a minute region (spot) of the disk recording layer to at or above its Curie Temperature in the presence of a magnetic field. The Curie Temperature is the temperature at which the disk's recording layer's resistance to magnetic change is greatly diminished. If a region of the recording layer is heated to this temperature and then allowed to cool back down through its Curie Temperature, the region or spot will be able to assume a new magnetic polarity. The direction or magnetic polarity assumed by the region is controllable by an applied external magnetic field typically generated by a bias magnet 130 within the optical drive 100, i.e., the magnetic polarity is set to the same magnetic direction or polarity as that of the applied external magnetic field created by bias magnet 130.

As the laser beam intensity can be modulated at a very high frequency, the area of a disk which is heated is correspondingly very small and can be thought of as a magnetic domain or bit.

Typically, all user sectors of a CCW WORM disk are set, during the manufacturing process, so that all magnetic domains or bits within the sector have the same value. This in effect "zeroes" the user data area of the disk.

To write meaningful data to the medium, only the data bits needing to be changed to a "one" are recorded. The external magnetic field generated by the bias magnet 130 is biased to the opposite polarity than that which was used to write the "zeroes" during the manufacturing process. As the medium passes under the laser beam it is heated to its Curie Temperature and allowed to cool while under the influence of the external magnetic field. The "one" magnetic domain is now of reverse polarity with regard to that of the "zero" magnetic domain. Using the above method it is possible to store data in various sequences of ones and zeroes on the recording medium in the form of magnetic domains.

To read the data written to the disk, the same laser, now at a reduced power level, is used. The polarity of the magnetic domain (data) affects the polarity of the reflected laser beam back to the read optics contained in the drive. The polarity of the reflected laser beam will be rotated a few degrees either way dependent upon the magnetic polarity of the area of the medium currently being read. The optics and circuitry within the drive are able to detect the difference in polarity rotation and can translate this difference to "zeroes" and "ones". Using this method the "ones" and "zeroes" encoded on an optical disk can be read back and translated by the drive 100 into electronic "ones" and "zeroes" that then may be transmitted to a host computer 200.

With CCW WORM media, data written to the disk is typically directed to an unwritten sector or sectors until all user sectors on the disk are written. The rewriting of a previously written sector is not allowed in disks conforming to draft International Standard ISO/IEC FCD 15286:1997 (E). To prevent overwriting a previously written sector, this standard specifies that each sector (FIG. 2) shall have a Flag field in the ALPC and Gaps field of the formatted header and SWF (Sector Written Flag) in the user data field. All optical disk drives conforming to the standard read the Flag field and the SWF field before allowing writing to each sector. If either field is set, meaning user data has already been written to the sector, further writing to the sector is prevented by the drive firmware. Conversely, if both fields are not set, then the sector does not contain user data and may be written to.

The ISO standard defines seven disk types (as discussed in the Background) which are coded onto the disk in byte 7 of the data field of a sector (FIG. 4). It is this disk type that indicates the disk is WORM, and is in effect a coded rewrite-protect switch. The proposed new erasable WORM media would have this byte set to a new value of "erasable WORM". This disk type would mark the disk as write once for all standard commands, but would also enable an optical drive 100, which contained firmware implementing the present invention, to act on two new commands which would allow the user to erase either a single file or an entire disk surface.

To perform erasure of user data, the information contained in the Flag and SWF fields would be read by the drive but ignored by the new drive firmware. That is, the setting of these fields would not inhibit the drive from overwriting the user data area of the sector.

In a manner consistent with CCW WORM media, the medium would be heated to or past its Curie Temperature in the presence of a magnetic field supplied by the bias magnet 130. All previously written magnetic domains in the selected user data sector or sectors would be reset to a "zero" value. The value of the Flag and of the SWF field would also be reset to indicate that the sector does not contain user data and may be written to in the manner consistent with CCW WORM. Also overwritten would be any Cyclic Redundancy Codes and Error Correction codes created and written to the user sector by the initial write of user data to the sector.

It would then be at the discretion of the user to leave the erased sector in an erased state or to erase and then overwrite the sector for additional data security.

Figure 5:
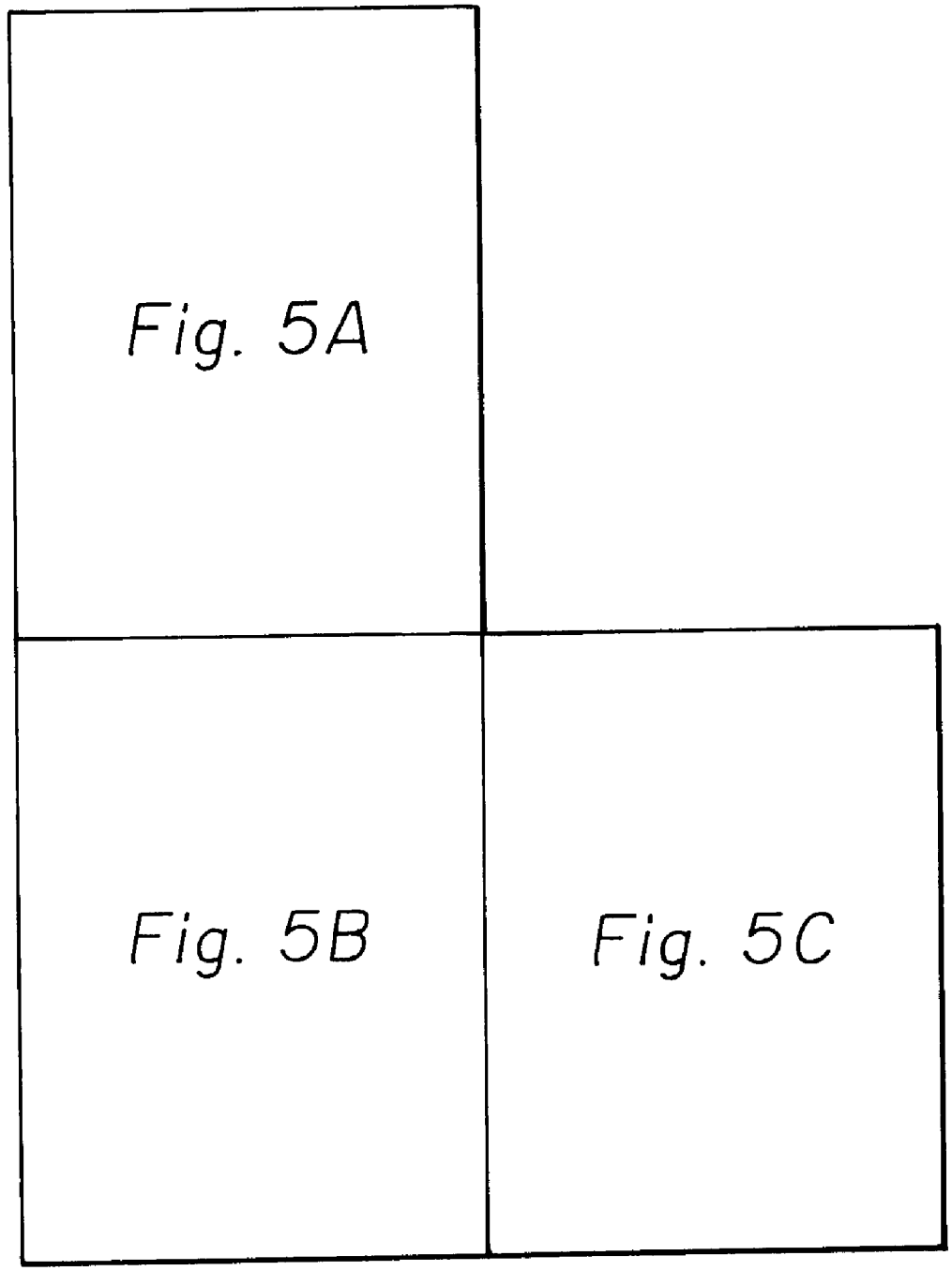
FIGS. 5–5C are flowcharts illustrating the method of the present invention.
Figure 5A:
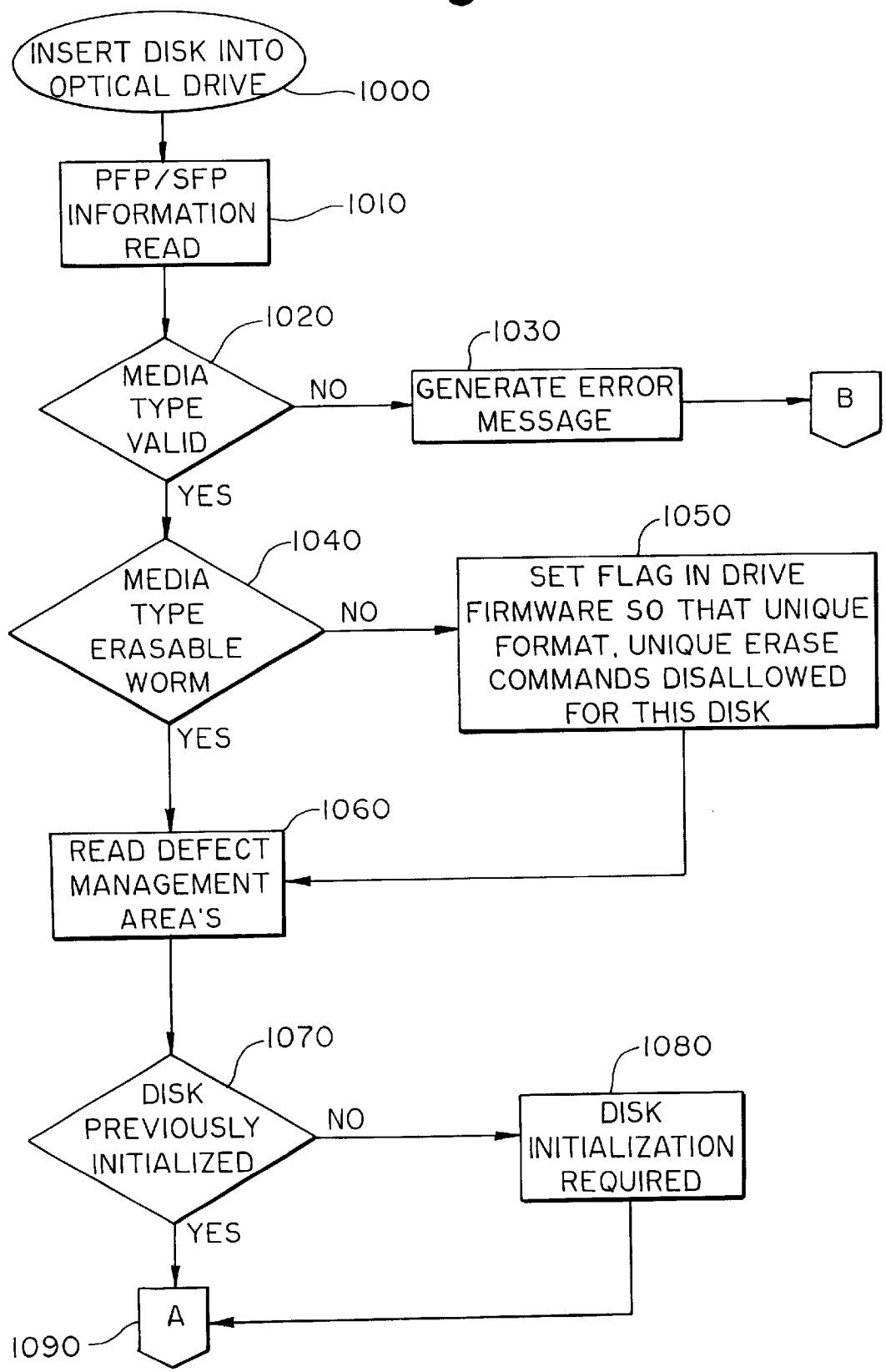
Figure 5B:
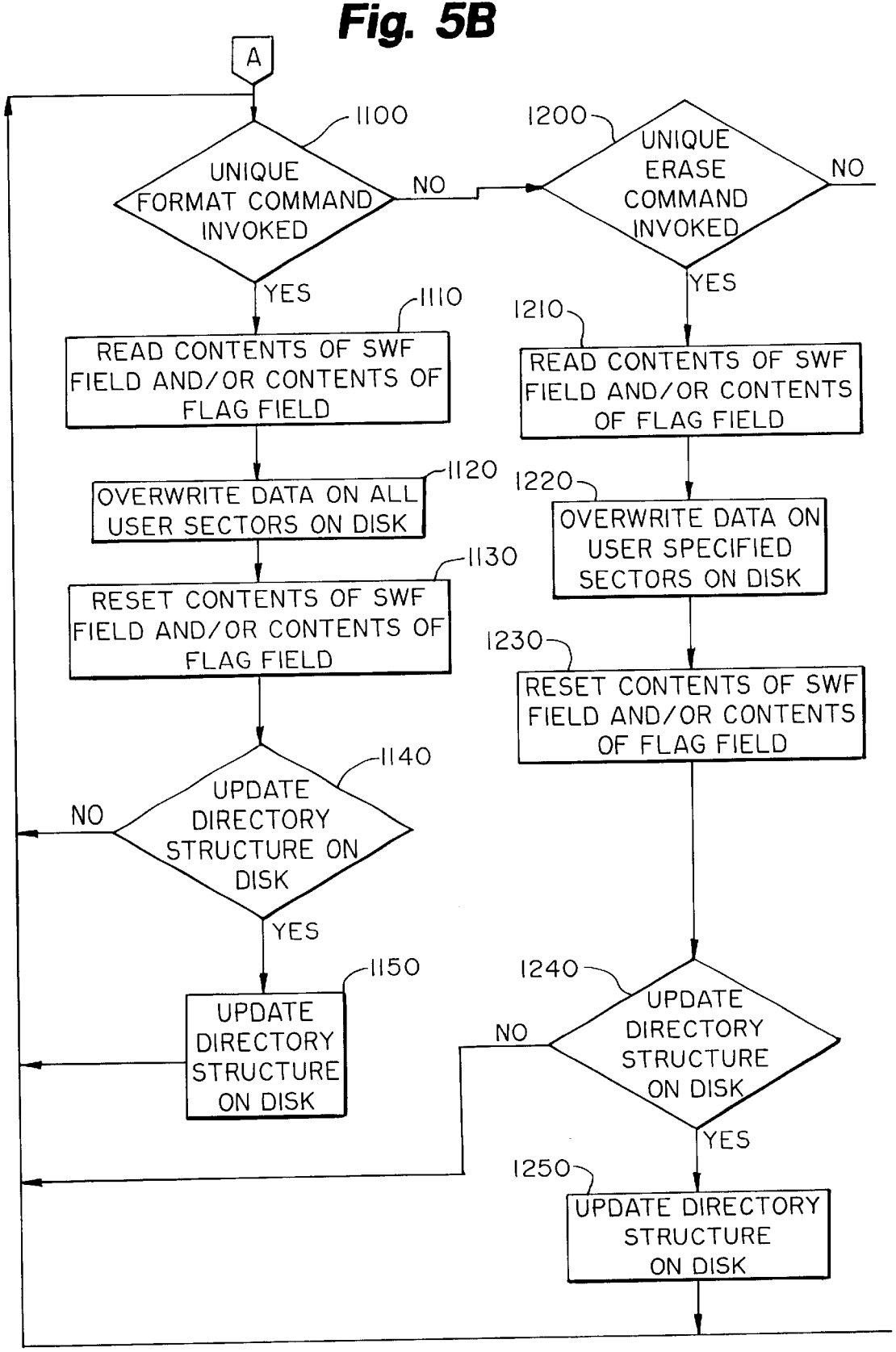
Figure 5C:
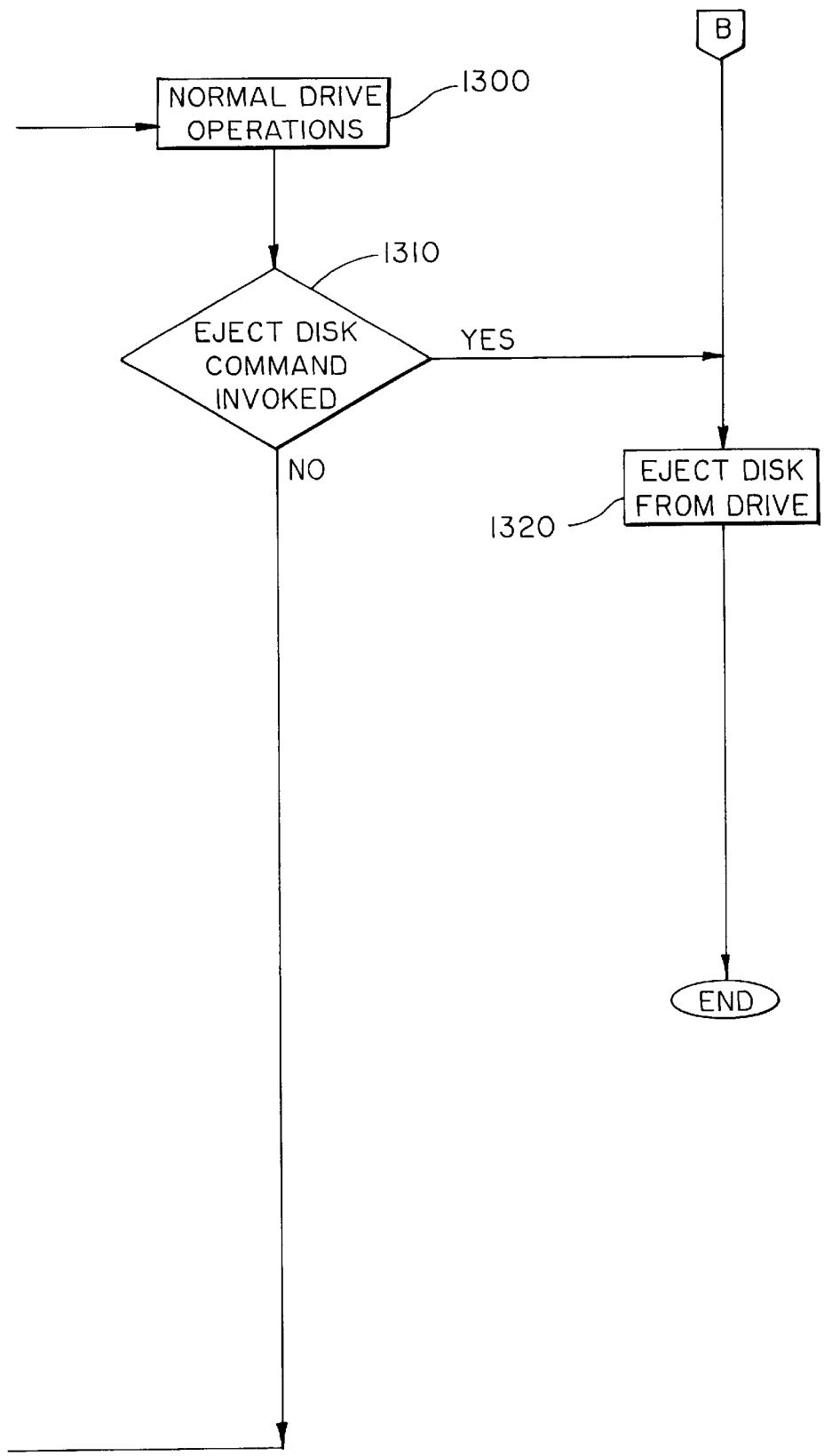

FIGS. 5A and 5B are a detailed flowchart of the method of the present invention.

Upon insertion of the optical disk into the drive (step 1000), the drive shall read the information encoded in PEP (phase encoded part) and/or the SFP (standard format part) zones (FIG. 3) (step 1010). The media type shall be ascertained and if the media type is invalid, an error message will be generated (step 1030).

If the media type is not "erasable WORM" (step 1040), then a flag will be set in the firmware so that Unique Format and Unique Erase commands shall be disabled for this disk. Otherwise, the flag shall not be set (step 1050). The media type is defined in byte 7 of a PEP Zone sector data field and in byte 7 of a sector of the Control Trace SFP Zones. Note that the first 18 bytes (0 to 17) of the SFP Zone are identical with the 18 bytes of the PEP Zone sector data field.

The disk shall be initialized prior to its first use in a manner consistent with CCW WORM. That is, the DMA's (Defect Management Areas) shall be recorded prior to first use of the disk. With CCW WORM and ERASABLE WORM only a single initialization will be allowed. Disk initialization is indicated by the recording of all DMA's. If the disk has never been initialized, then access to the write-once zone shall be disallowed until initialization has occurred. (steps 1060–1090).

The following provides details of the two new unique Small Computer Systems Interface (SCSI) commands which would be used to erase user data.

The SCSI command which will allow the entire disk surface to be erased shall be a UNIQUE FORMAT command (step 1100). The command shall have the following capabilities.

1) This command shall overwrite (erase) the entire user area of the disk and erase all user data present on the disk.
2) There shall be no limit on the number of times this command shall be able to be executed during the lifetime of a disk.
3) The logical construction of this command shall be similar in form and functionality to the 'format unit' [04H] command currently described in the SCSI ANSI specification (ANSI X3.131-1994).
4) The command shall enable the user to rewrite a previously written sector either by reading the contents of the SWF (sector written field) and/or the contents of the Flag field (located between the Sector Header and the Data Record). (step 1110) The firmware of the drive shall check the data returned but shall not inhibit any writing to (i.e. erasure of) that sector if the flags are set to indicate that user data is resident within the sector.
5) Any sector(s) acted on by this command shall have the user data and any CRC codes associated with the user data completely erased (step 1120). The sector will be left in a state such that the user may write new data to the erased sector(s) in a manner consistent with CCW WORM.
6) The SWF and Flag fields shall be reset to indicate that the sector is now blank and may be written. (step 1130).

The SCSI command which will allow a single file to be erased shall be a UNIQUE ERASE command (step 1200). The command shall have the following capabilities.

1) Be able to erase all blocks starting from a specified Logical Block Address to the end of the disk.
2) Be able to erase a number of contiguous logical blocks as specified by the user.

3) Be able to accept Physical Block Addressing and/or Logical Block Addressing.

4) There shall be no limit on the number of times this command shall be able to e executed during the lifetime of the disk.

5) The logical construction of this command shall be similar in form and functionality to the 'erase" [19H] currently described in the SCSI ANSI specification (ANSI X3.131-1994).

6) The command shall enable the user to rewrite a previously written sector either by reading the contents of the SWF field and/or the contents of the Flag field (located between the Sector Header and Data Record).(step 1210) The firmware of the drive shall check the data returned but shall not inhibit the writing to (i.e. erasure of) that sector if the flags are set to indicate that user data is resident within the sector.

7) Any sector(s) acted upon by this command shall have the user data and any CRC codes associated with the user data completely erased (step 1220). The sector will be left in a state such that the user may write new data to the erased sector(s) in a manner consistent with CCW WORM.

8) The SWF and Flag fields shall be reset to indicate that the sector is now blank and may be written. (step 1240).

At the user's discretion, the file allocation tables and directory structure of the disk shall be updated (steps 1150, 1250) to reflect changes made to the data on the disk by the usage of the Unique Format and Unique Erase commands. Any updating of the directory structure and file allocation tables shall be done in a manner consistent with CCW WORM.

Only the UNIQUE FORMAT and UNIQUE ERASE commands shall have the capability of erasing and/or overwriting the existing user data on the optical disk cartridge. Any other commands which can directly or indirectly alter the written data of the user shall not be allowed.

The present invention may be embodied in other specific forms without departing from the spirit or essential attributes thereof; therefore, the illustrated embodiments should be considered in all respects as illustrative and not restrictive, reference being made to the appended claims rather than to the foregoing description to indicate the scope of the invention.

What is claimed:

1. A method for selectively enabling writing of data multiple times onto a write-once read-many optical disk by a host system, the disk having a disk type indicator, and each sector having a SWF field and a flag field and user data, wherein new data bits replace existing data bits in a one-for-one ratio without mapping, comprising the steps of:

(a) reading a disk type indicator;

(b) setting a firmware flag allowing writing to the disk if the disk type is erasable WORM;

(c) receiving a write command from the host system, the command specifying a sector to write to;

(d) reading the contents of the disk SWF and flag fields for the sector;

(e) overwriting all user data on the sector with all zeroes if the firmware flag is set, replacing every user data bit in the sector with a zero in a one-for-one ratio without mapping; and (f) resetting the contents of the disk SWF and flag fields to indicate the sector is available for writing.

2. The method of claim 1, further comprising a step of writing new user data to the sector, replacing every user data bit in the sector with a bit of new user data in a one-for-one ratio without mapping.

3. The method of claim 1, further comprising a step of updating the disk directory structure.

4. A method for selectively enabling writing of data multiple times onto a write-once read-many optical disk by a host system, wherein new data bits replace existing data bits in a one-for-one ratio without mapping, the disk having a disk type indicator, and each sector having a SWF field and a flag field and user data, the method comprising the steps of:

(a) reading a disk type indicator;

(b) setting a firmware flag allowing writing to the disk if the disk type is erasable WORM;

(c) receiving a write command from the host system, the command specifying to write to all sectors;

(d) reading the contents of the SWF and flag fields for each sector;

(e) overwriting all user data on each sector with all zeroes if the firmware flag is set, replacing every user data bit in the sector with a zero in a one-for-one ratio without mapping; and (f) resetting the contents of the disk SWF and flag fields to indicate each sector is available for writing.

5. The method of claim 4, further comprising a step of writing new user data to each sector, replacing every user data bit in the sector with a bit of new user data in a one-for-one ratio without mapping.

6. The method of claim 4, further comprising a step of updating the disk directory structure.

7. Apparatus for selectively enabling writing of data multiple times onto a write-once read-many optical disk by a host system, the disk having a disk type indicator, and each sector having a SWF field and a flag field and user data, wherein new data bits replace existing data bits in a one-for-one ratio without mapping, comprising an optical disk drive having:

(a) a spindle motor rotating an optical disk;

(b) an optical assembly/laser generating a laser beam adapted to heat a minute region on the optical disk;

(c) a bias magnet affecting the polarity of the heated region;

(d) a write/read channel driving the optical assembly/laser and bias magnet;

(e) a write/read controller adapted to process a unique erase command and thereby controlling the optical assembly/laser and bias magnet to write every user data bit of a sector to zero in a one-for-one ratio without mapping; and (f) a small computer system interface receiving write commands from a host system.

8. The apparatus of claim 7, further comprising a unique format/erase controller to process a unique format command and thereby controlling the optical assembly/laser and bias magnet to write every user data bit of every sector to zero in a one-for-one ratio without mapping.

9. The apparatus of claim 7, wherein the write/read controller is further adapted to write new user data to a sector in a one-for-one ratio without mapping.

10. The apparatus of claim 8, wherein the unique format controller is further adapted to write new user data to all sectors in a one-for-one ration without mapping.

* * * * *